United States Patent

[11] 3,612,647

[72] Inventor Ernest J. Laprairie
    Suite 2, 4907 8th Street, S. W., Calgary, Alberta, Canada
[21] Appl. No. 36,013
[22] Filed May 11, 1970
[45] Patented Oct. 12, 1971

[54] REAR VIEW MIRROR IN ROTATABLY WIPED ENCLOSURE
    6 Claims, 5 Drawing Figs.
[52] U.S. Cl. .................................................. 350/61,
    15/250.1, 219/219, 350/63, 350/66, 350/67, 350/288
[51] Int. Cl. ...................................................... B60s 1/44,
    B60s 1/60, G02b 7/18
[50] Field of Search ........................................... 350/289,
    61, 288, 62, 63, 66, 67; 15/250.01, 250.10, 250.02, 250.05; 219/219

[56] References Cited
UNITED STATES PATENTS
| | | | |
|---|---|---|---|
| 1,196,081 | 8/1916 | Carence ...................... | 15/250.1 |
| 2,797,287 | 6/1957 | Prutzman .................... | 219/219 |
| 3,058,142 | 10/1962 | Pollock ....................... | 15/250.02 |
| 3,135,004 | 6/1964 | Naigraw ...................... | 15/250.01 |

Primary Examiner—David Schonberg
Assistant Examiner—John W. Leonard
Attorney—Fetherstonhaugh & Co.

ABSTRACT: A vehicle rear vision mirror is enclosed in a protective case which is partially enclosed in a housing, the housing supporting the case for rotation about the mirror. The housing also supports a wiper blade in contact with a transparent window of the case and a motor is provided to rotate the case and wipe the window across the blade.

PATENTED OCT 12 1971 3,612,647
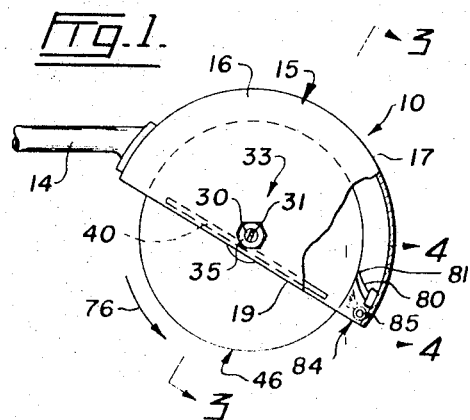
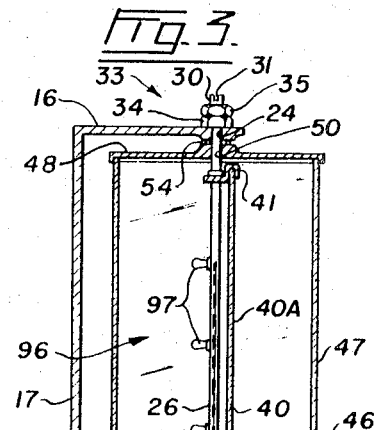
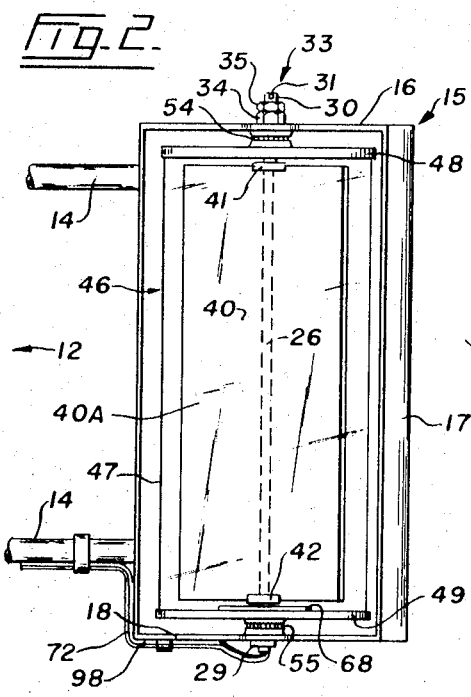
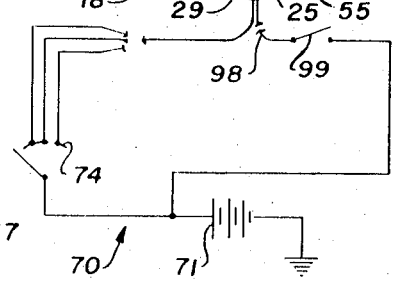
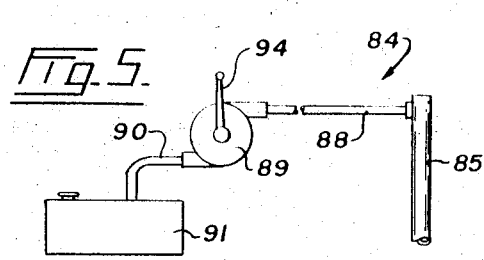
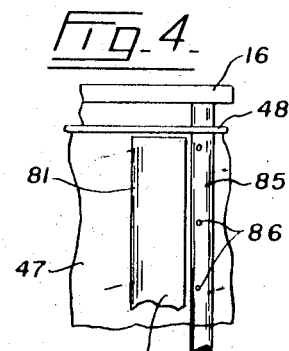
INVENTOR
ERNEST J. LAPRAIRIE
BY
Fetherstonhaugh & Co.
ATTORNEYS

REAR VIEW MIRROR IN ROTATABLY WIPED ENCLOSURE

My invention relates to a rear vision mirror assembly which is particularly intended for use on trucks, busses and the like.

A vehicle such as a trailer-truck for example, usually is equipped with two rear vision mirrors, there being one mirror laterally offset from the cab on the dirver's side and another similarly mounted mirror on the right side of the vehicle. The driver very often must rely entirely on these mirrors to provide a view to the rear since the large overhanging body of the trailer otherwise blocks his field of vision. When a conventional rear vision mirror becomes coated with rain, fog, ice or snow as so often happens, the driver is blinded as far as rearward vision is concerned. A mirror on the left normally is spaced too far from the cab for the driver to wipe clean and the mirror on the right, of course, is completely out of reach so that there is very little the driver can do to remedy this hazardous driving condition.

I have overcome the disadvantages of conventional rear vision mirrors by providing a mirror which is completely shielded form the elements so that it cannot be obscured by rain, or dirt and grease thrown up from the road surface as so readily happens with a conventional mirror. A major part of the mirror shielding case itself is enclosed within a housing and any obscuring material which accumulates on the exposed portion of the case is wiped off when the motor driven case is rotated against a stationary wiper blade or it is melted off when an element within the case is energized to heat the case from within. Thus, the driver of the vehicle always is assured of a clear, unobstructed view to the rear regardless of weather or road conditions.

In drawings which illustrate a preferred embodiment of the invention,

FIG. 1 is a plan of the rear vision mirror assembly, in accordance with the present invention, FIG. 2 is a front elevation, FIG. 3 is a vertical section taken on the line 3—3 of FIG. 1 and includes a wiring diagram for the assembly, FIG. 4 is an enlarged fragmentary vertical section taken on the line 4—4 of FIG. 1, and FIG. 5 is a diagram showing a preferred fluid circuit for the window washing means.

Referring to the drawings, the numeral 10 indicates generally an embodiment of the present assembly which is intended to be attached to the cab or other suitable part of the truck (not shown) so as to project laterally from a side of the vehicle, in this particular instance, the right side opposite the driver. For this purpose, the assembly 10 is provided with mounting means generally indicated at 12 and comprising a number of supporting arms 14 and a housing 15. The inner ends of the tubular arms 14 are bolted or otherwise secured to a part of the truck so as to support the housing 15 a suitable distance from the right side of the truck cab, in a vertical position and at a height appropriate for the line of vision of the truck driver. Housing 15 has a top wall 16, a substantially semicylindrical front wall 17, and a bottom wall 18. This construction provides the housing 15 with an open side 19 which faces inwardly and rearwardly as shown best in FIG. 1.

The top and bottom walls of the housing 15 have vertically aligned openings 24 and 25, see FIG. 3, and extending through these openings is a tubular post 26. This post 26 has a head 29 which abuts the underside of the bottom wall 18. Post 26 also has a threaded upper end 30 which is provided with a slot 31. Thus, the post 26 is rotatably supported by the housing 15 and can be clamped thereto by locking means 33 comprising a nut 34 and a cooperating lock nut 35 which are fitted to the upper end 30 of the post.

A rectangular mirror 40 is secured to the post 26 by means of rearwardly projecting fittings 41 and 42, see FIG. 3. The reflective surface 40A of the mirror faces outwardly of the housing 15 or, in other words, is viewable from the open side 19 of said housing. The vertically disposed mirror 40 is angled towards the truck driver's line of vision so that he can watch traffic approaching the rear of the vehicle on his right. To adjust the angle of the mirror, the nuts 34 and 35 are slacked off and a screw driver (not shown) is entered into the slot 31 to turn the post 26 and the mirror 40 thereon as required, whereupon the nuts are retightened in proper sequence to clamp the post to the housing 15 and thus lock the mirror in the selected angular position.

The mirror 40 is enclosed within a hollow protective case generally indicated at 46. As shown best in FIGS. 2 and 3, case 46 comprises a cylindrical window 47 which is fitted at the upper and lower ends thereof with caps 48 and 49. Window 47 preferably is made of thin, nonreflecting glass, although a suitable clear plastic may be used. The end caps 48 and 49 of the case desirably are of metal and are provided with centrally disposed openings 50 and 51 (FIG. 3) through which the post 26 rotatably extends. Suitable thrust bearings 54 and 55 are provided between the end caps of the case 46 and the adjacent walls of the housing, the post 26 rotatably extending through these bearings as well. Thus, the case 46 is rotatably supported by the housing 15 and is free to rotate about the normally stationary post 26.

Drive means generally indicated at 60 is provided for rotating the case 46 about the vertically disposed longitudinal axis thereof as shown in FIG. 3. The preferred drive means 60 comprises a three-speed 12-volt electric motor 62 which is secured to the post 26, above the lower end cap 49, by means of a bracket 63. Drive shaft 65 of the motor 62 projects vertically downwards and is fitted with a pinion 67 which engages an internally toothed ring gear 68 suitably secured to the inner surface of the lower end cap 49 of the protective case. In FIG. 3, the motor 62 is shown electrically connected by circuit 70 to the battery 71 of the vehicle. Circuit 70 includes a lead 72 which extends from the motor 62, through the lower end of the tubular post 26, and out through the head 29. A suitable three-way switch 74 is included in the circuit 70, this switch being located within the cab of the truck within easy reach of the driver. By operation of the switch 74 from the normally off position to a selected one of the three available operating positions, the truck driver can energize the motor 62 to rotate the case 46 at any one of the three available low speeds in the direction of arrow 76, see FIG. 1.

Referring now particular to FIGS. 1 and 4, the rear vision mirror assembly 10 will be seen to be provided with a wiper blade 80 for cleaning the outer surface of the transparent window 47. The flexible rubber blade 80 preferably is mounted on the inner surface of the front wall 17 of the housing near the extreme outer edge thereof. The free edge 81 of the vertically disposed blade 80 projects inwardly so as to engage the outer surface of the window 47, the blade being bent in the direction of arrow 76 by contact with the window as shown in FIG. 1. Thus, when the case 46 is rotated, the surface of the glass window 47 between the end caps 48 and 49 is wiped by the stationary blade 80.

The assembly 10 is provided with means generally indicated at 84 for washing the window 47 should it become coated with dirt or the like which cannot readily be removed by the wiper blade 80 alone. As shown in FIGS. 1 and 5, the washing means 84 comprises a pipe 85 which is carried by the housing 15 alongside the wiper blade 80. Pipe 85 has a plurality of vertically spaced nozzles 86 which are directed inwardly towards the window 47 near the free edge 81 of the wiper blade. As shown in FIG. 5, the pipe 85 is connected by a tube 88 to a suitable pump 89 which may simply be hand-operated as shown. Alternatively, the pump 89 may be motor driven and controlled by a driver actuated switch. The hand-operated pump would be mounted in the truck cab in a position readily accessible to the driver. Another tube 90 connects the intact side of the pump 89 to a reservoir tank 91 which contains a suitable window washing solution, not shown, which solution preferably would be one containing antifreeze. By operating handle 94 of the pump 89, the truck driver can direct a few squirts of the solution on to the window 47 to loosen any dirt, frost, etc., the loosened dirt subsequently being wiped off the window by the blade 80.

Referring again to FIG. 3, the rear vision mirror assembly 10 is shown provided with means generally indicated at 96 for heating the interior of the case 46. Preferably, the heating means 96 comprises four small heat lamps 97 which are mounted on the post 26 at suitably vertically spaced intervals. The lamps 97 are connected by a lead 98, which extends through the hollow post 26 and the case 46, into the circuit 70, see FIG. 3. This electric circuit 70 includes a switch 99 which is mounted in the cab of the truck so as to be within easy reach of the driver. When the window 47 is in danger of becoming fogged up because of an accumulation of ice or frost, the driver closes the switch 99 to energize the lamps 97 which generate sufficient heat within the case 46 to prevent the buildup of this ice or frost formation on the outer surface of the window.

From the foregoing, it will be apparent I have provided a rear vision mirror assembly which will operate to ensure that the driver of a trailer truck or the like has a clear view to the rear of the vehicle at all times. If a light rain is falling for example, the motor is run at low speed to keep the window 47 clear of moisture. The motor speed can easily be stepped up by actuating the switch 74 if the rain becomes heavy or snow or sleet is falling. Whenever the temperature drops to a point where the window 47 is likely to become covered by ice, the heating means 96 is energized to raise the temperature of the case 46 to a level where the window can be cleared by the blade 80. Normally, the washing means 84 is not used unless the window 47 is smeared by road dirt or grease and it is then operated only at intervals during a trip to wash off the window which is wiped clean by the blade 80.

I claim:

1. A rear vision mirror assembly for a vehicle comprising a housing having an open side, a mirror mounted on a post, said post being supported by the housing for rotation about the longitudinal axis of said post whereby the mirror can be adjusted to a selected angle relative to the line of sight of the driver of the vehicle, means for locking the post to the housing with the mirror in the selected angular position, a protective case rotatably mounted in the housing and enclosing the mirror, said protective case having a transparent window through which the mirror can be viewed from the open side of the housing, a stationary wiper blade engaging the transparent window, and motor driven means for rotating the protective case whereby the transparent window is wiped by the wiper blade.

2. A rear vision mirror assembly as claimed in claim 1, and including energizable heating means mounted inside the protective case for controlling the temperature of the protective case.

3. A rear vision mirror assembly as claimed in claim 1, and including washing means for cleaning the transparent window in advance of the wiper blade, said washing means comprising a pipe supported by the housing adjacent the wiper blade, said pipe having spaced-apart nozzles directed at the transparent window, a fluid circuit connecting the pipe and the nozzles to a reservoir containing a cleaning solution, and pump means included in the fluid circuit operable by the driver of the vehicle to eject selected amounts of the cleaning solution from the nozzles on to the transparent window.

4. A rear vision mirror assembly for a vehicle comprising a housing having an open side, a mirror supported by the housing with the reflective surface thereof viewable from the open side of the housing, a protective case rotatably mounted in the housing and enclosing the mirror, said protective case having a transparent window through which the mirror can be viewed, a wiper blade supported by the housing in engagement with the transparent window, motor driven means for rotating the protective case to wipe the transparent window against the wiper blade, a pipe supported by the housing adjacent the wiper blade, said pipe having spaced-apart nozzles directed at the transparent window, a fluid circuit connecting the pipe and the nozzles to a reservoir containing a cleaning solution, and pump means included in the fluid circuit operable by the driver of the vehicle to eject selected amounts of the cleaning solution from the nozzles on to the transparent window.

5. A rear vision mirror assembly as claimed in claim 4, and including energizable heating means for controlling the temperature of the protective case.

6. A rear vision mirror assembly as claimed in claim 4, in which said motor driven means comprises an electric motor having a plurality of operating speeds adapted to be selectively controlled by the driver of the vehicle.